United States Patent [19]
Elabd et al.

[11] Patent Number: 5,196,939
[45] Date of Patent: Mar. 23, 1993

[54] METHOD AND APPARATUS FOR TRANSFERRING IMAGES FROM AN IMAGING ARRAY

[75] Inventors: Hamman Elabd, Sunnyvale; Martin K. S. Shih, San Jose; Philip C. Cheng, Cupertino, all of Calif.

[73] Assignee: Loral Fairchild Corporation, Syosset, N.Y.

[21] Appl. No.: 457,988

[22] Filed: Dec. 28, 1989

[51] Int. Cl.⁵ .................... H04N 3/14; H04N 5/335
[52] U.S. Cl. .................... 358/213.11; 358/213.27; 358/213.29
[58] Field of Search .................. 358/213.11, 213.27, 358/213.26, 213.29

[56] References Cited

U.S. PATENT DOCUMENTS

| | | | |
|---|---|---|---|
| 4,740,828 | 4/1988 | Kinoshita | 358/213.11 |
| 4,761,683 | 8/1988 | Matteson et al. | 358/213.26 |
| 4,858,020 | 8/1989 | Homma | 358/213.26 |
| 4,910,599 | 3/1990 | Hashimoto | 358/213.26 |
| 4,949,183 | 8/1990 | Stevens | 358/213.29 |

Primary Examiner—David K. Moore
Assistant Examiner—Wendy R. Greening
Attorney, Agent, or Firm—Townsend and Townsend

[57] ABSTRACT

The present invention is a method and apparatus for transferring data from an imaging device. An image array is used to capture an image arranged in columns and rows of charges held in pixels in the image array. These charges are then transferred through a group of vertical registers to a storage register. Once in the storage register rows which have not been selected for transfer are dumped to a dump drain. Rows that have been selected for transfer continue through the vertical registers until they reach a pair of transfer registers from which the rows are output.

24 Claims, 14 Drawing Sheets

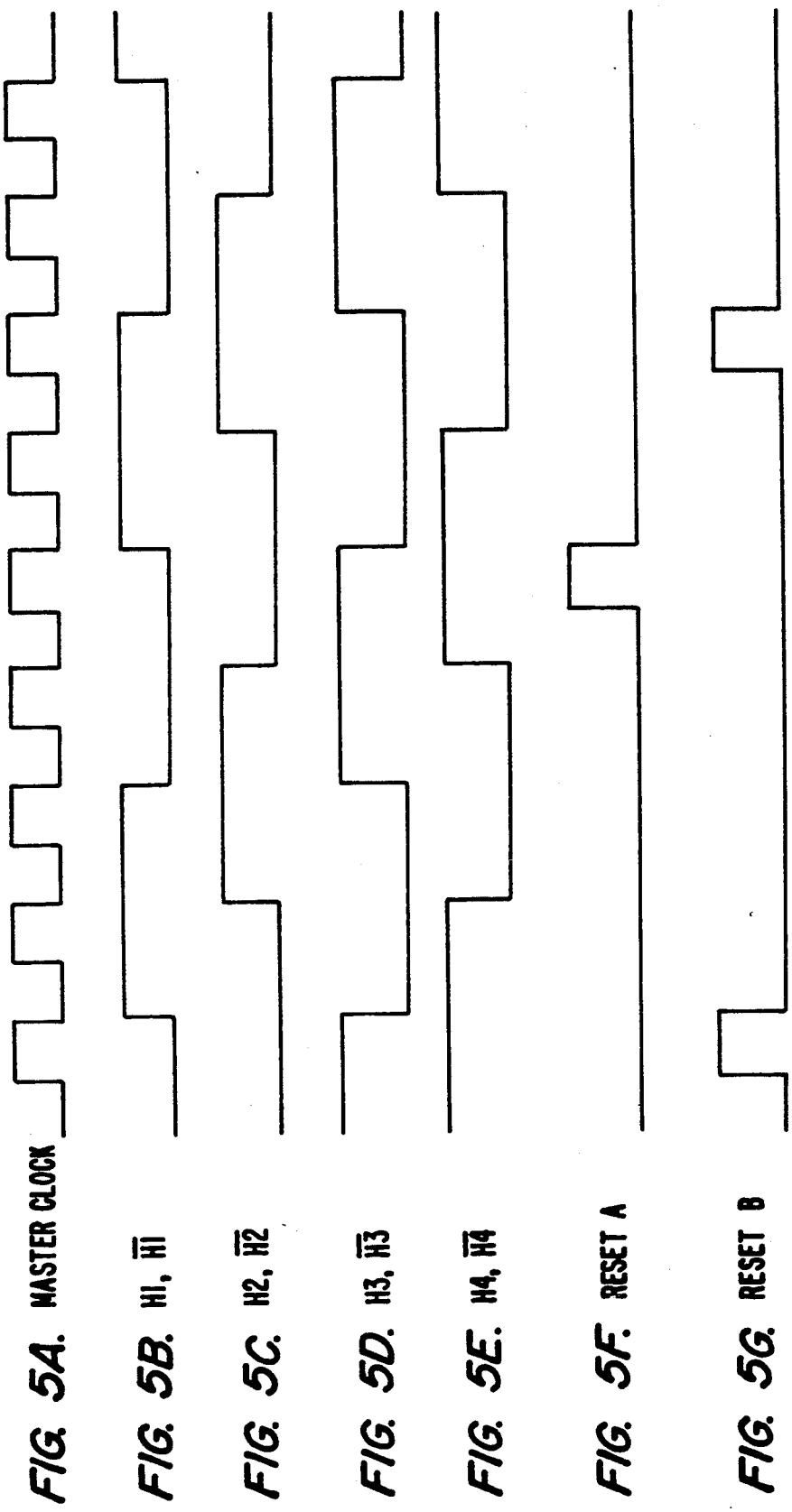

5,196,939

METHOD AND APPARATUS FOR TRANSFERRING IMAGES FROM AN IMAGING ARRAY

BACKGROUND OF THE INVENTION

The present invention relates generally to imaging devices. More particularly, the invention is directed to a system for transferring data from an imaging array in a system having high frame rate transfer and windowing capabilities suitable for tracking applications.

Imaging devices are useful in tracking applications for determining the position of an object. For example, it may be desirable to take an image of an object as it moves from one point to another. It is also possible to analyze direction or determined speed of an object and maintain the object in the field of view of a camera.

Infrared charge coupled imaging devices (IR-CCDs) provide low noise and are attractive for tracking applications. Implementation of IR-CCDs in tracking systems has the disadvantage of slow data transfer thereby introducing delay in the tracking loop.

Within the tracking system, transfer of the image from the imaging array is accomplished through the use of a transfer register. The transfer register is approximately the same width as a row of the imaging array. A group of vertical registers are used to transfer an image, one row at a time, from the imaging array into the transfer register. Once a row has been transferred into the transfer register, the transfer register is clocked such that each of the pixel charge packet values are shifted to the next location in the transfer register. The end location of the transfer register is connected to an output port through which data held in the end location may be transmitted. Once the entire row has been output through the output port, a new row is transferred through the vertical registers into the transfer register.

Another aspect of previously known devices for transferring images from an imaging array is that they require the transfer of the entire image stored in the imaging array. Therefore, even if a user requires only a small portion of the image, he user is still required to transfer the entire image. Transfer of the entire image takes valuable time during which the user must wait before a new image can be taken causing delays in the tracking loop. A further problem associated with the present techniques for transferring an image from an imaging array is the loss of charge, known as charge transfer efficiency, as charges are transferred through the vertical registers and the transfer register before being output through the output port. As the rate of data transfer through the system is increased, charge transfer efficiency is reduced.

From the above it is seen that an improved imaging device and associated charge transfer apparatus is desired.

SUMMARY OF THE INVENTION

The present invention is a method and apparatus for transferring an image from an imaging array with high-frame rate transfer and windowing capabilities. An imaging device is equipped with an image array, a storage register, and two transfer registers each with an output port. A user may select a portion of the image defined by particular rows in the imaging device for transfer. The entire image is then transferred one row at a time to the storage register through a group of vertical registers. Those rows that are not part of the portion selected by the user are dumped to dump drains connected to the storage register. The rows that are selected are passed through the vertical registers to the transfer registers where they are eventually output through output ports.

Two transfer registers are used to accomplish higher frame rate output transfer as well as higher charge transfer efficiency at cryogenic temperatures. This reduces tracking loop delays in the system and improves performance. As a result, details and fidelity of the image are improved.

The first transfer register transfers only the pixel charge packet values of odd-numbered pixel positions in the particular row that is being transferred. The second transfer register transfers only the pixel charge packet values of even-numbered pixel positions. Further, an "empty site" remains in the transfer register locations between locations in the transfer register containing transferred pixel charge packet values. Therefore, only every other location in the transfer registers contain pixel charge packet values.

One reason that the charge transfer efficiency is increased by using two transfer registers is that a pixel charge packet value to be output from the transfer register is combined with the adjacent empty site before it is output through the output port. This is accomplished by adding trailing empty site charge value to the last location of the transfer register before it is output. This accumulation of charge values reduces the loss of charge value and thereby improves the quality of the image after it is reformed. At cryogenic temperatures, recapture is critical because bulk silicon trapping of charge tends to be high. Any recapture of lost charge increases efficiency and provides improved imaging results.

Reformation of the video signal occurs as the charge values are output from each of the two transfer registers. These values are merged to generate the image as it was captured in the imaging array.

The charge value transfer rate is increased because unnecessary portions of the image which have not been selected by the user are not transferred at all (such as thermal background). Instead, these portions are immediately dumped from the storage register directly to a dump drain.

An additional benefit achieved by the empty site implementation is that keeping track of each pixel value is made easier. Since this is the case, it is possible to speed up the transfer rate of the pixel charge packet values through the transfer registers.

A further aspect of the present invention is the provision of distinct hardware savings over digital image processing hardware. This is so because a desired area of an image can be isolated. An initial tracking image is reduced to its essential portion and only that portion is transferred. Since it is only necessary to process the desired window of interest, the amount of hardware and video memory can be reduced accordingly.

A further aspect of the present invention is the ability to perform vertical and horizontal spatial filtering. Spatial filtering refers to the technique for reducing the detail of an image and at the same time reducing the amount of pixel data that needs to be transferred and processed. For example, two rows or more of pixel data can be accumulated. The result is that the image will lose some of its detail. However, the number of pixel charge values that need to be transferred is reduced. A savings of transfer of one half is attained in the case where two rows are combined in the storage wells of the storage register. This saves time and further, the amount of hardware necessary for transferring an image. Of course, the same technique can be applied to image columns. By accumulating two or more columns in storage wells in the transfer registers, the horizontal details are reduced but the transfer rate is increased. The high spatial resolution of the imager is useful in the target acquisition phase. The low spatial resolution image is useful in the target tracking phase.

A further aspect of the invention is the ability to change the sequence of the rows being read out of the transfer registers. Pixel values are stored in storage sites in the storage register and can then be read out in a different order if desired.

Still a further aspect of the invention is the ability to change the constant thermal background level of the image. This is accomplished by changing the level of the pixel charge packet value by a constant value in each of the storage sites in the storage register. A technique for producing this result is referred to as the fill and spill technique which permits an image to be made lighter or darker and serves to improve charge transfer efficiency at low light level, i.e., night sky applications.

For a more complete understanding of the nature and advantages of the invention, reference should be made to the ensuing detailed description, taken in conjunction with the accompanying drawings.

BRIEF DESCRIPTION OF THE DRAWINGS

FIGS. 5A-5G are timing diagrams showing the reset signals of the transfer registers shown in FIG. 4;

DETAILED DESCRIPTION OF THE DRAWINGS

Figure 1:
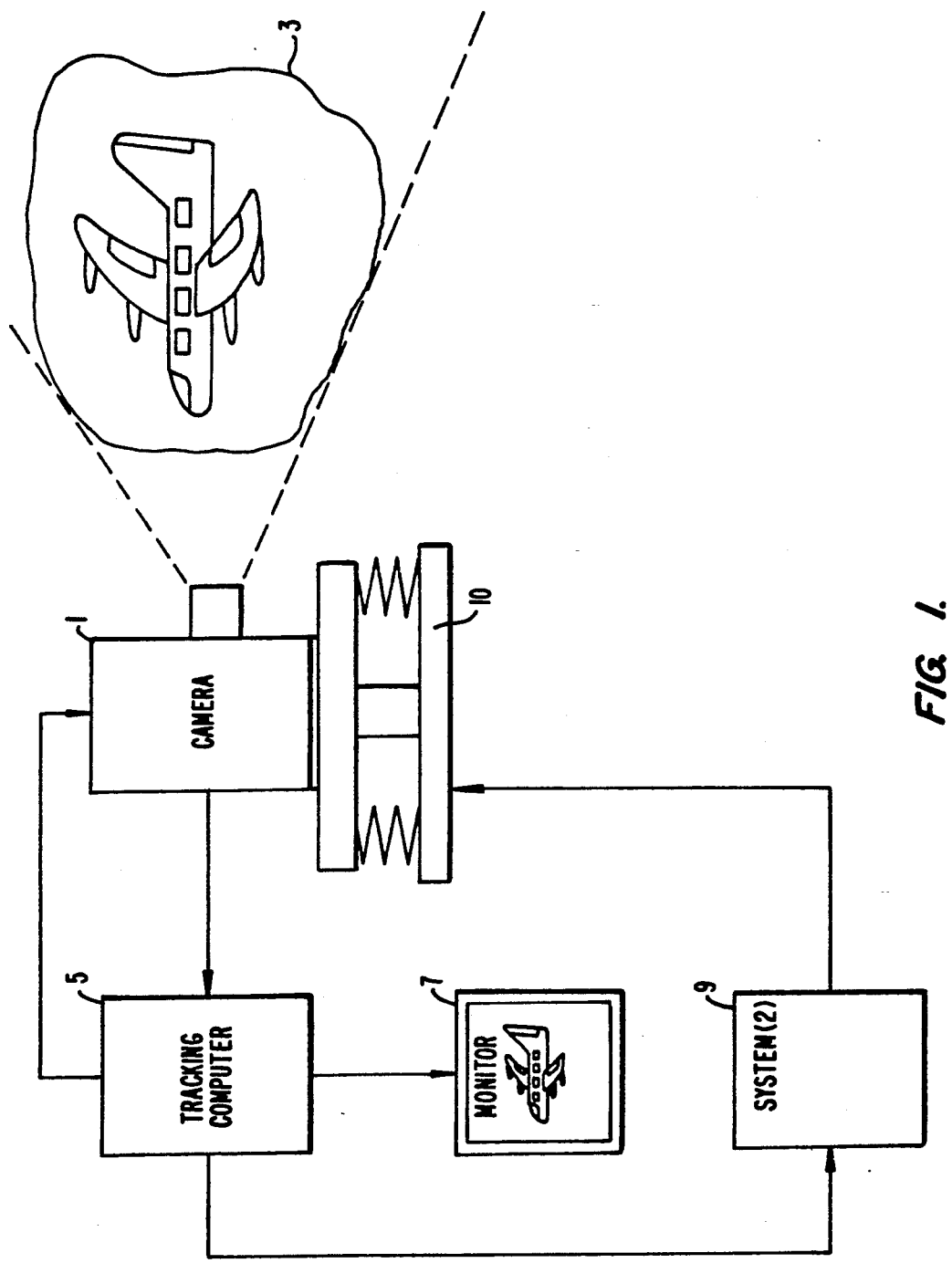
FIG. 1 is a block diagram illustrating a system including an imaging device for tracking applications.

FIG. 1 is a diagram illustrating a system including an imaging device for tracking applications. A camera 1 is shown for tracking an image 3. Image 3 is then transferred to tracking computer 5. Once transferred to tracking computer 5, image 3 can be displayed on monitor 7. Tracking computer 5 is used to select a window of interest. Further, image 3 can be transferred to a second system 9 where operations can be performed upon it. For example, in a tracking application, system 9 may be a real time computer for issuing commands to a platform 10 to move such that the position of camera 1 can continue to track image 3. Platform 10 can be moved in the x, y, and z direction to keep an object in the field of view of camera 1.

Figure 2A:
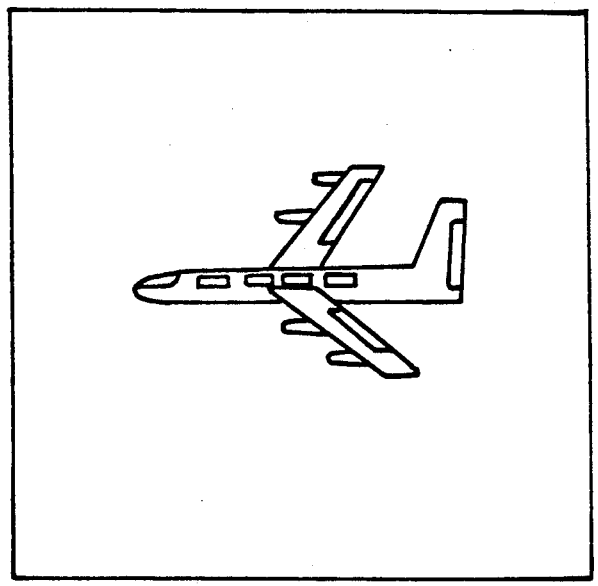
FIGS. 2A and 2B show diagrams illustrating the selection of a tracking window from an initial image.

FIG. 2A shows the original image 3 as seen in the field of view of camera 1. A desired portion of the image is then selected. For example, in FIG. 2B, an airplane has been selected and only those rows and columns of the image array containing parts of the airplane need be processed.

Figure 3:
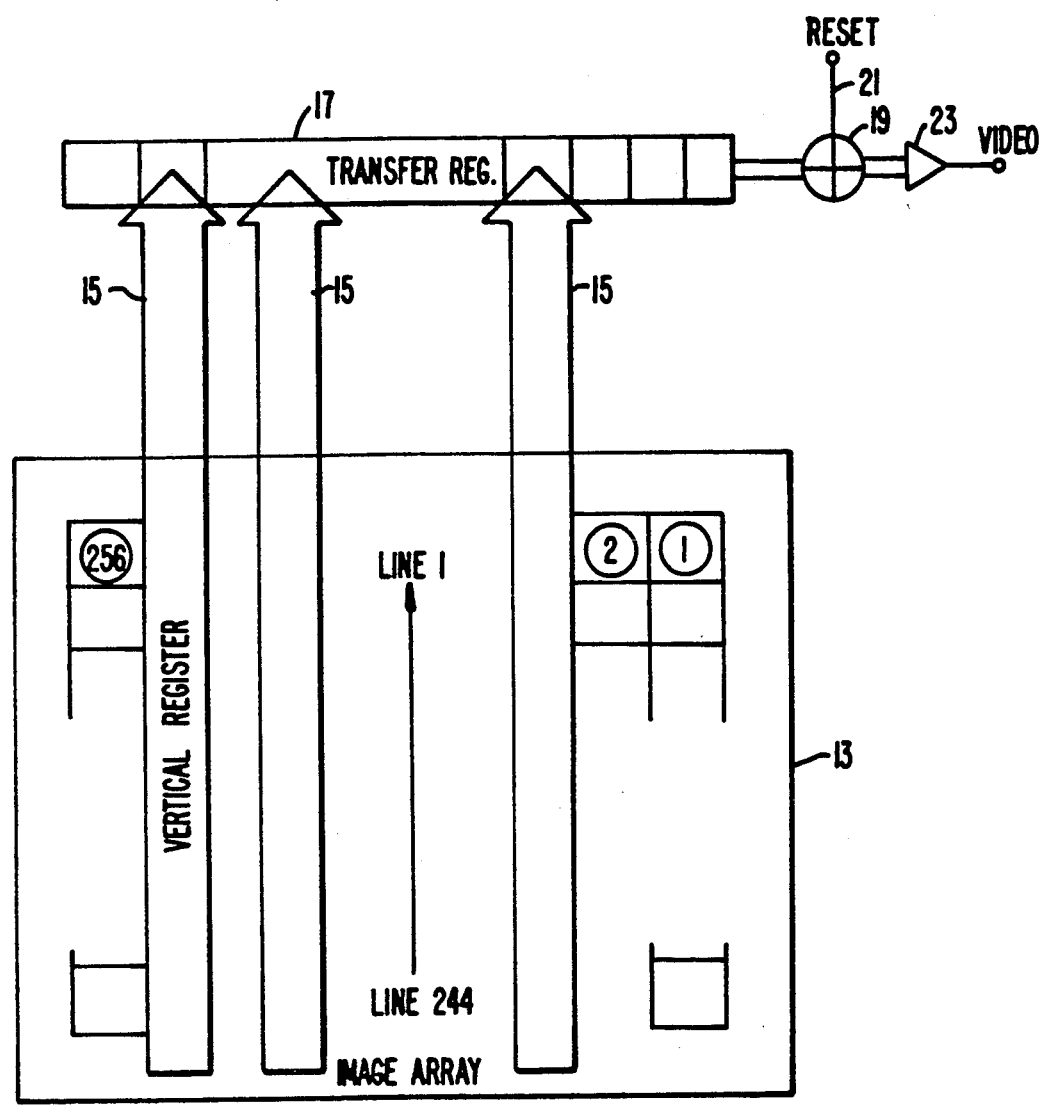
FIG. 3 is a diagram illustrating an imaging device in an embodiment in accordance with the prior art.

FIG. 3 is a diagram illustrating an imaging device 11 in an embodiment in accordance with the prior art. Imaging device 11 contains an image array 13 which is used to capture an image to be transferred. The image array may be, for example, a 244×256 PtSi Schottky barrier infrared, charge-coupled device (IR-CCD). A group of vertical registers 15 are used to transfer data stored in columns of pixels in image array 13 to storage locations in a transfer register 17. Once a row of data has been transferred from image array 13 to transfer register 17, it is clocked out through output port 19. The output port 19 may be a floating diffusion or floating gate amplifier known to one of ordinary skill in the art. A reset line 21 is used to reset output port 19 so that the next value shifted into output port 19 can be transmitted from transfer register 17.

Figure 4:
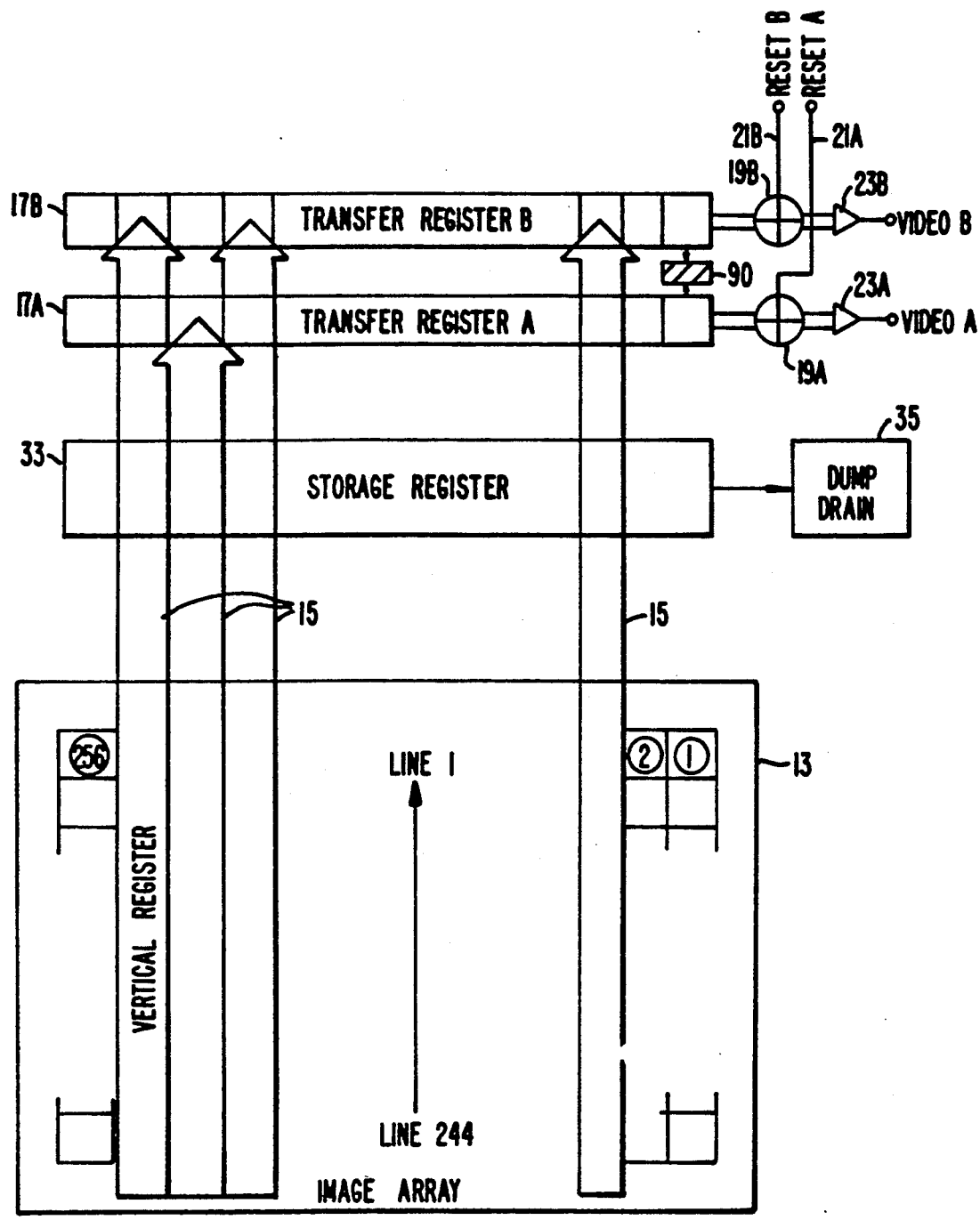
FIG. 4 is a diagram illustrating an imaging device in accordance with an embodiment of the present invention.

FIG. 4 is a diagram illustrating an imaging device in accordance with an embodiment of the present invention. Imaging device 31 contains an image array 13 similar to that used in imaging device 11 of FIG. 2. A group of vertical registers 15 are used to transfer rows of data held in image array 13 to storage register 33. It is then determined whether a particular row held in storage register 33 is one selected by the user for transfer. If the row is not selected for transfer it is dumped in vertical dump drain 35. On the other hand, if it is a row which has been selected for transfer, it continues through vertical registers 15 to transfer registers 17A and 17B. Unselected columns are dumped in horizontal dump drain 90.

Each row of data transferred from storage register 33 to transfer registers 17A and 17B is divided up between the two transfer registers 17A and 17B. Transfer register 17A receives the charge stored in the even-numbered columns of the transferred row while transfer register 17B receives charge stored in the odd-numbered columns of the transferred row. In both transfer registers 17A and 17B an "empty site" occurs in storage locations interleaved between charge values transferred from image array 13. The data held in transfer registers 17A and 17B are then clocked out through output ports 19A and 19B, respectively. Reset lines 21A and 21B are used to reset output ports 19A and 19B, respectively, when data have been transmitted from output ports 19A and 19B. Data output through output ports 19A and 19B are input to video amplifiers 23A and 23B. The reset ports are activated only after every other transfer period such that charge from a particular pixel is always summed with a trailing empty position in the transfer register.

FIGS. 5A-5G are timing diagrams showing the reset signals of the transfer registers shown in FIG. 4. A transfer register master clock signal is shown which is typically run at 15 MHz and reset at 7.5 MHz. Video output signals, video A and video B from each video amplifier 23 are 180° phase-shifted with respect to the video output from the other video amplifier 23. In other words, as video output signal video A from video amplifier 23A is being output, output port 19B is being reset and made ready to output video output signal video B through output port 19B.

Signals H1-H4 and H1-H4 represent the gate clocks of transfer registers 17A and 17B of FIG. 4. Reset A occurs every other pulse of H3 and Reset B is 180° out of phase with Reset A. This is assuming that H3 is the last gate before the output port. In a preferred embodiment of the present invention a four phase clock is used to move charges through transfer registers 17. A similar clock is used to move charge through vertical registers 15.

FIG. 6 is a diagram showing the CCD channel layout of the system of FIG. 4. Vertical registers 15 are shown in the same layer as transfer registers 17A and 17B (slant hatching). Vertical registers 15 are each shown with a dump drain 35 (vertical hatching) and are connected to dump drain 35 by dump drain contact 55. The operation of dumping rows from vertical registers 15 is controlled by dump drain control gate 53. Movement of charge through vertical registers 15 is controlled by gates V1-V4 shown in FIG. 6 in limited detail. These gates function similarly to gates H1-H4 and H1-H4 as described below, the timing of which is shown in FIG. 5. Storage of charge is controlled by storage control gates 41A and 41B.

Storage control gates 41A and 41B make up a single row storage device of storage register 33 of FIG. 2. Storage sites 59 are positioned in each vertical register to store pixel charge packet values for manipulation. Manipulations of the pixel charge packet values in storage sites 59 permit rows to be combined for less detail and a variety of other operations. It is possible to add additional storage sites to vertical registers 15 to further enhance the ability to manipulate the charge data.

Every other vertical register 15 also contains a holding storage site 49 where a pixel charge can be held during transfer of pixel charge packet values to transfer registers 17.

Located between transfer registers 17A and 17B is a transfer region 47 through which charge is transferred from transfer register 17A to transfer register 17B. Connected to transfer registers 17A and 17B are output ports 9A and 19B which provide an output signal through video amplifiers 23A and 23B. Reset lines 21A and 21B are used to reset output ports 19A and 19B, respectively, once data from transfer register 17 are output.

Transfer register gates 43 and 44 are implemented in polysilicon layers overlaying the channel of transfer registers 17. Charges are moved underneath these gates by clocking the four-phase clock connected to each of the gates H1-H4 and H1-H4. Transfer register 17A and transfer register 17B are separated by an implanted channel stop region 45 typically made of boron doped silicon.

Figure 2B:
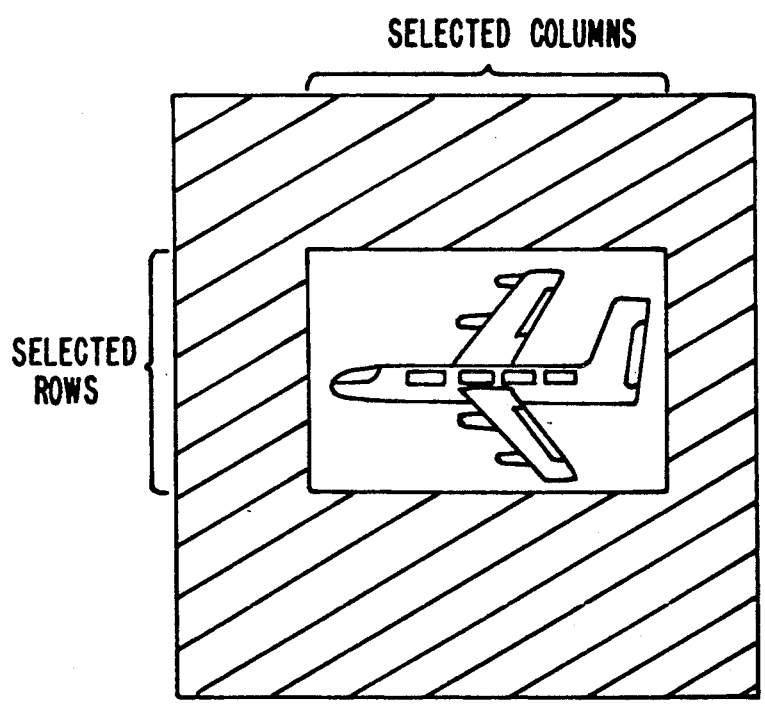
Figure 6A:
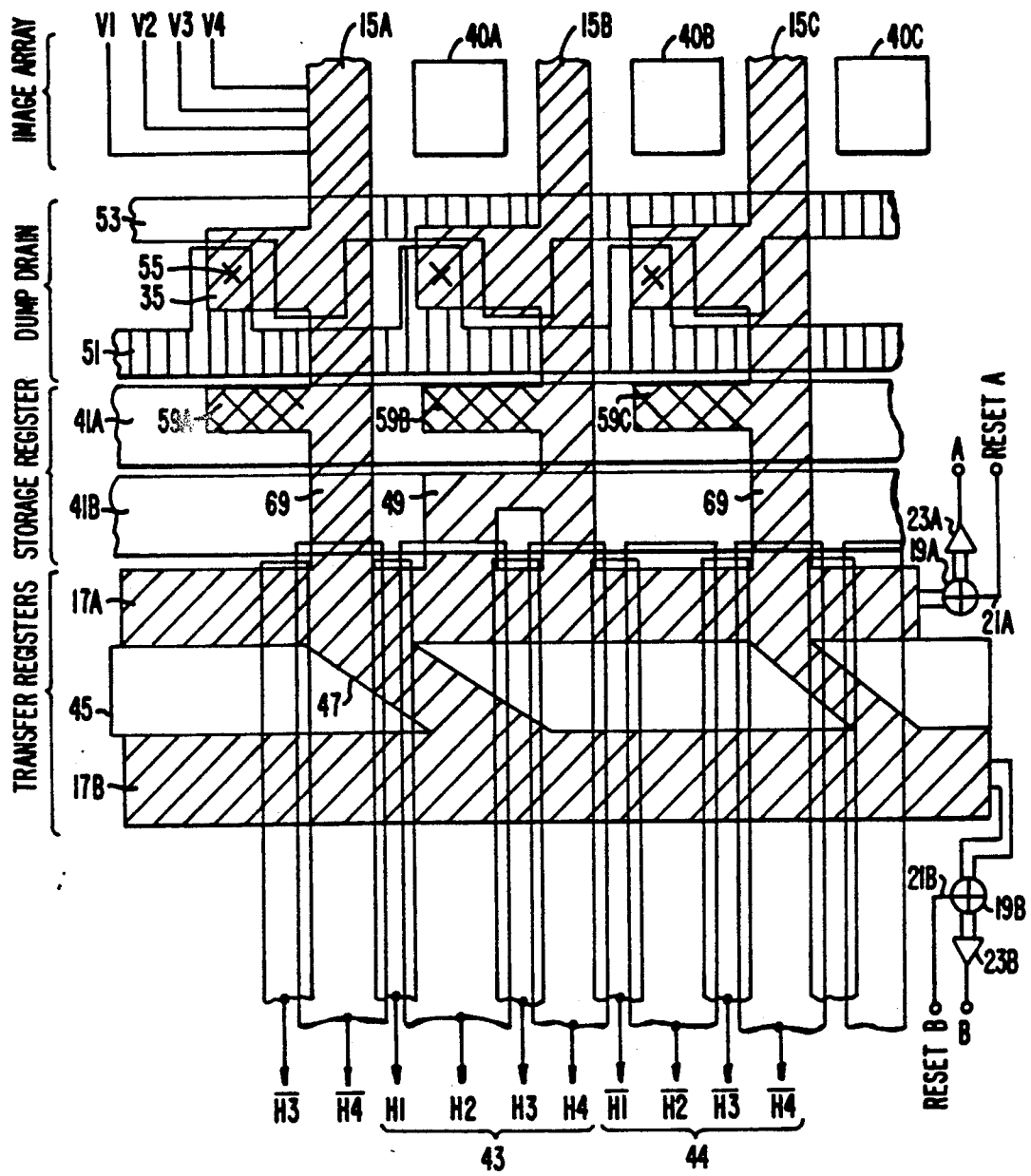
FIGS. 6A-6F are diagrams showing the channel layout of the imaging sensor device of the system of FIG. 4.

The operation of imaging device 31 will now be explained with reference to the structure shown in FIG. 6A in conjunction with the image diagrams of FIG. 2A and FIG. 2B. Initially, image array 13 captures an image arranged in rows and columns of charges in individual pixels 40 of image array 13. A representative image of an airplane is shown in FIG. 2A. Particular rows and columns of the image which contain the airplane are to be transferred while rows and columns not containing any part of the image are to be dumped to dump drains 35 by way of clocking dump drain control gate 53 (FIG. 2B).

The charges making up the image, referred to as data, are moved to vertical registers 15 from corresponding pixel sites 40. The data then move through vertical registers 15 by row. Rows not selected for transfer are dumped in dump drains 35. Rows that are selected are transferred into storage register 33 made up of individual storage sites 59 (cross-hatching) in vertical registers 15 lying below control gates 41A and 41B. If desired, charges held in storage sites 59 can be manipulated for various purposes. If no charge operations are required the charges are moved directly to storage site 49 in even columns by clocking $V_{str1}$ and to site 69 in odd columns by clocking gates V1-V4.

FIGS. 6B-F show the timing of the data as they move from storage sites 59 and 49 in vertical registers 15 through transfer register 17A, transfer region 47 and transfer register 17B. Charge movement is controlled by clocking the gates overlaying a particular region. For example, storage control gates 41A and 41B control charge movement from vertical registers 15 to storage sites 49 and 59 while control gates 43 and 44 control charge movement through transfer registers 17. The location of the charge at a particular time period is indicated by the number of the time period in a circle. The "o" or "e" subscript indicates whether the charge originated from an odd or even column.

Figure 6B:
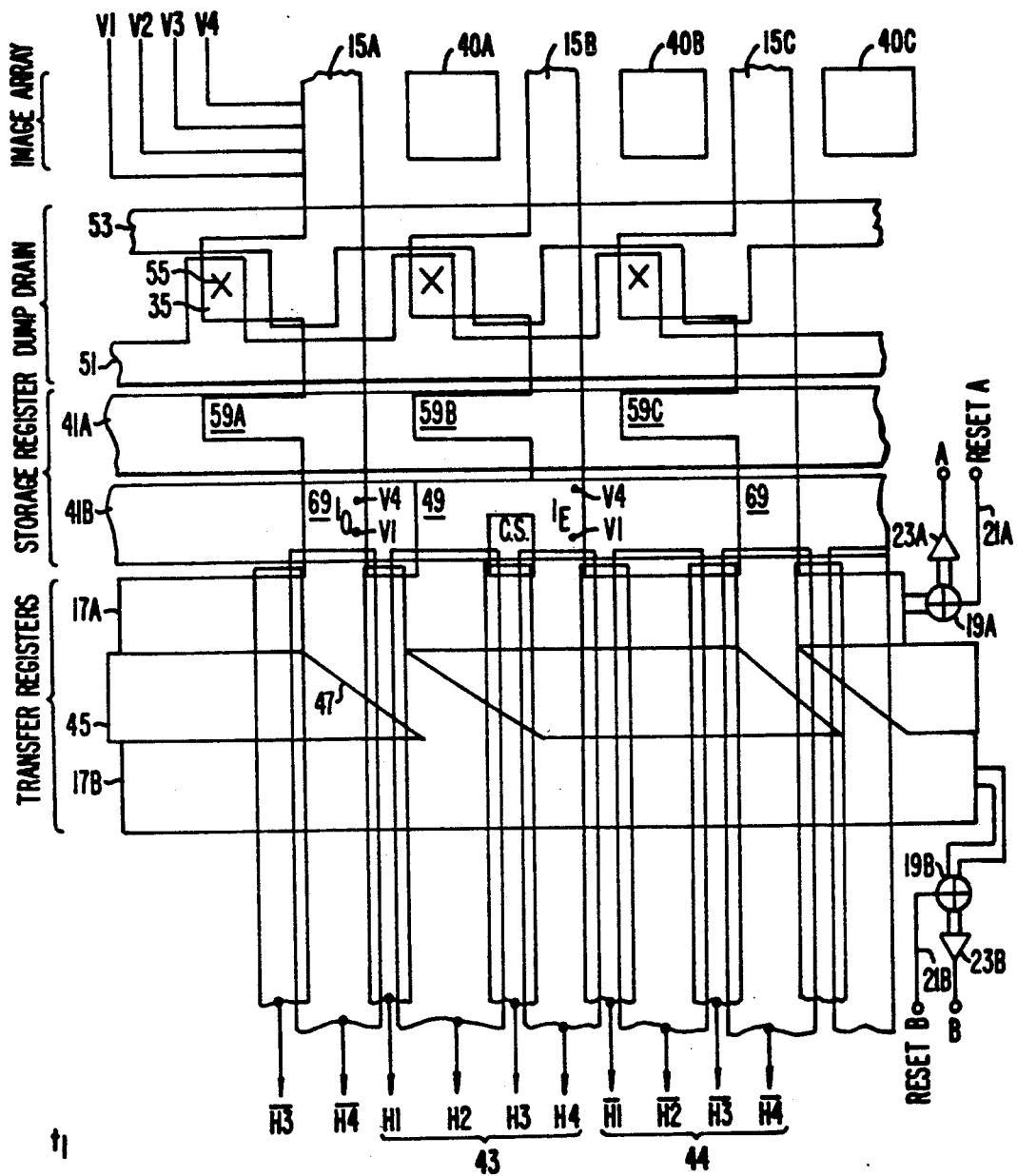
Figure 6C:
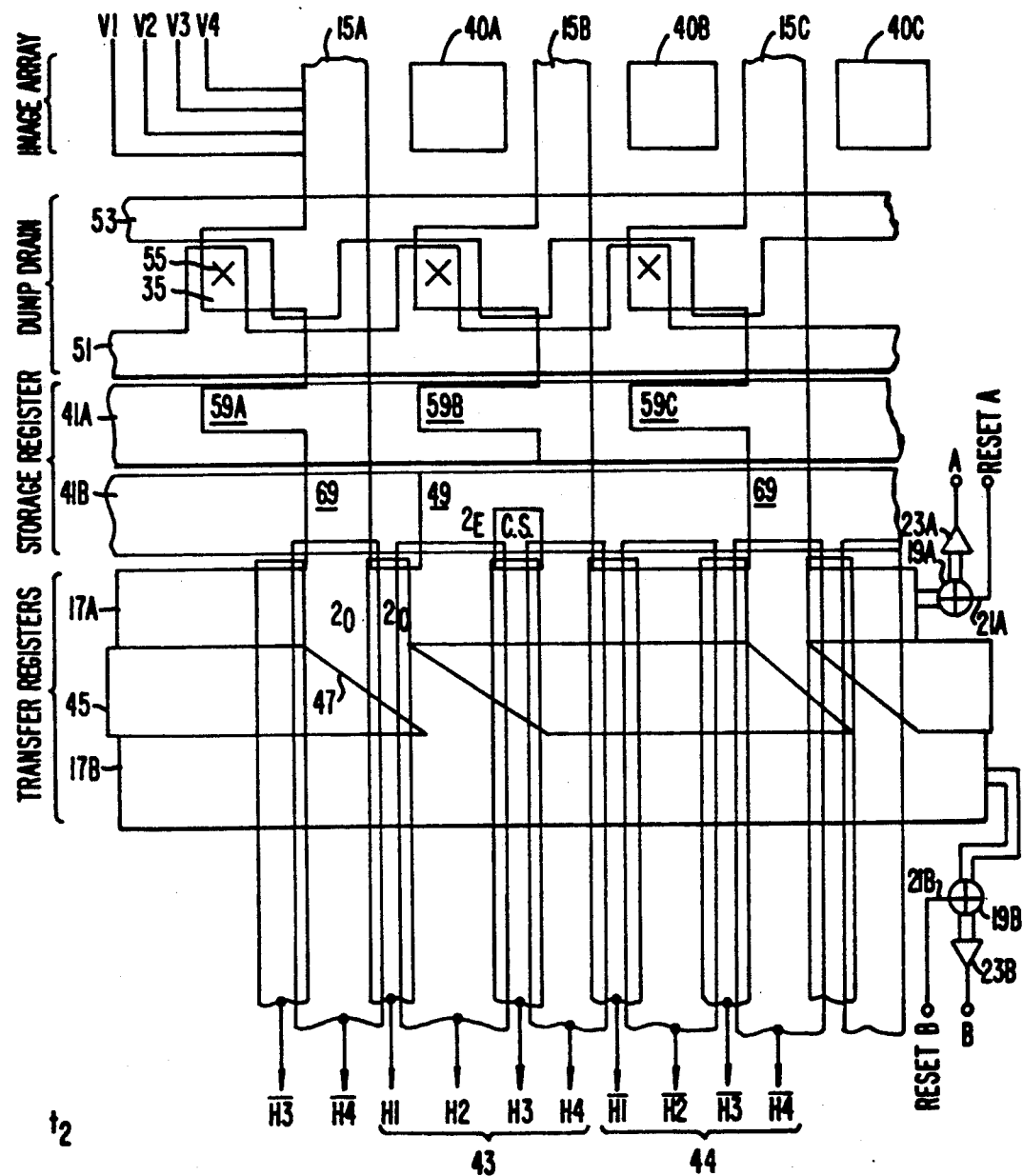

At time $t_1$, FIG. 6B shows both odd and even charges stored under gates $V_4$ and $V_1$ in vertical registers 15. At time $t_2$, FIG. 6C shows that charge is moved from even columns in vertical register 15B to storage site 49. Simultaneously, odd charges are moved from odd columns in vertical register 15B to transfer register 17A. To accomplish the movement of charge at $t_2$, $V_4$ and $V_1$ are clocked low, $V_{str1}$ is clocked high, and gates H3, H4, and H1 are clocked high.

Figure 6D:
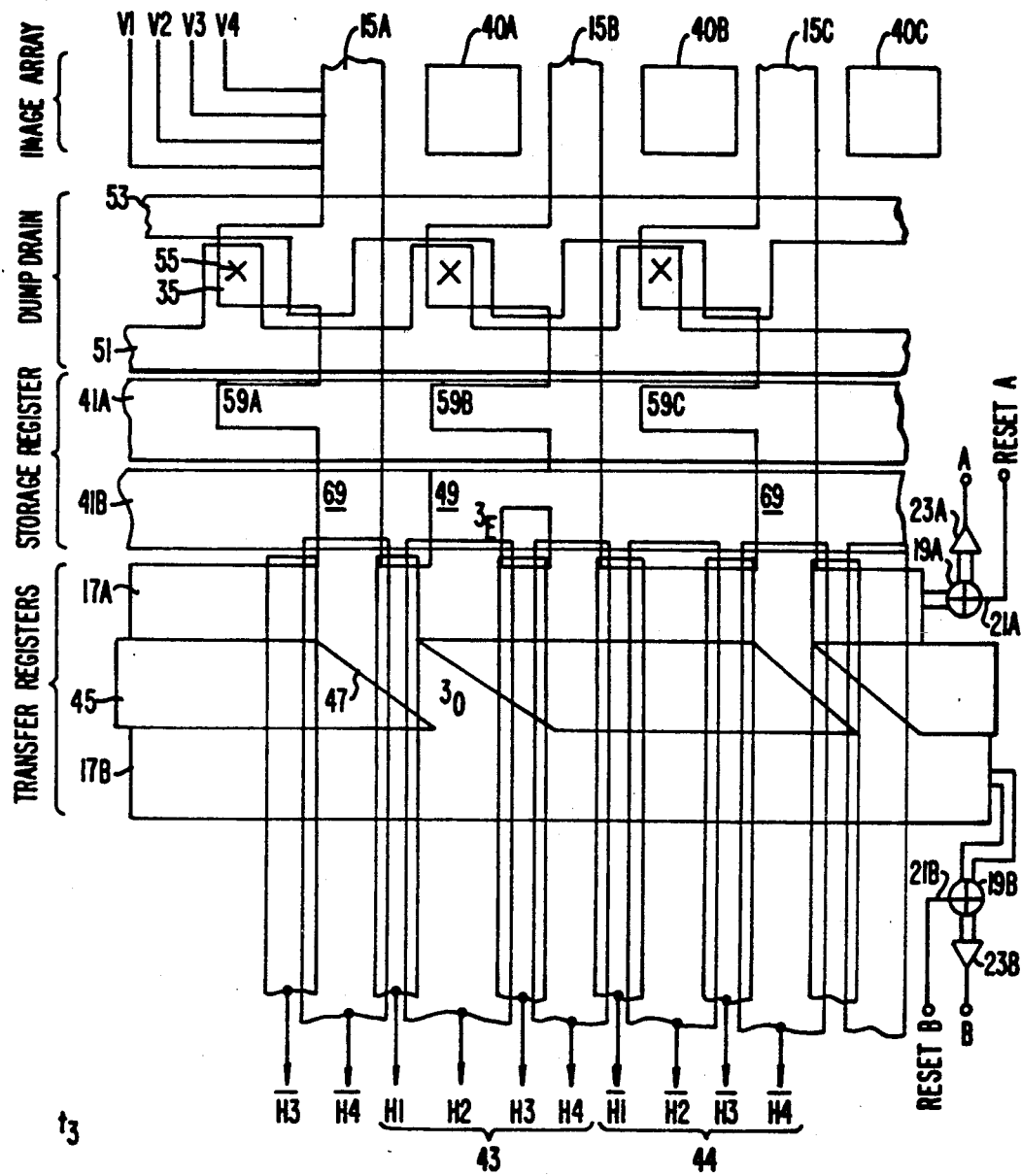

At time $t_3$, FIG. 6D shows that even charges continue to be stored under gate $V_{str1}$ in storage site 49 of vertical register 15A. Odd charges move into transfer region 47 between transfer register 17A and transfer register 17B. Movement of charges at time $t_3$ is accomplished by setting gates H3, H4, and H1 low. At the same time, $V_t$ which is not shown but is a gate overlaying transfer region 47 is set high.

Figure 6E:
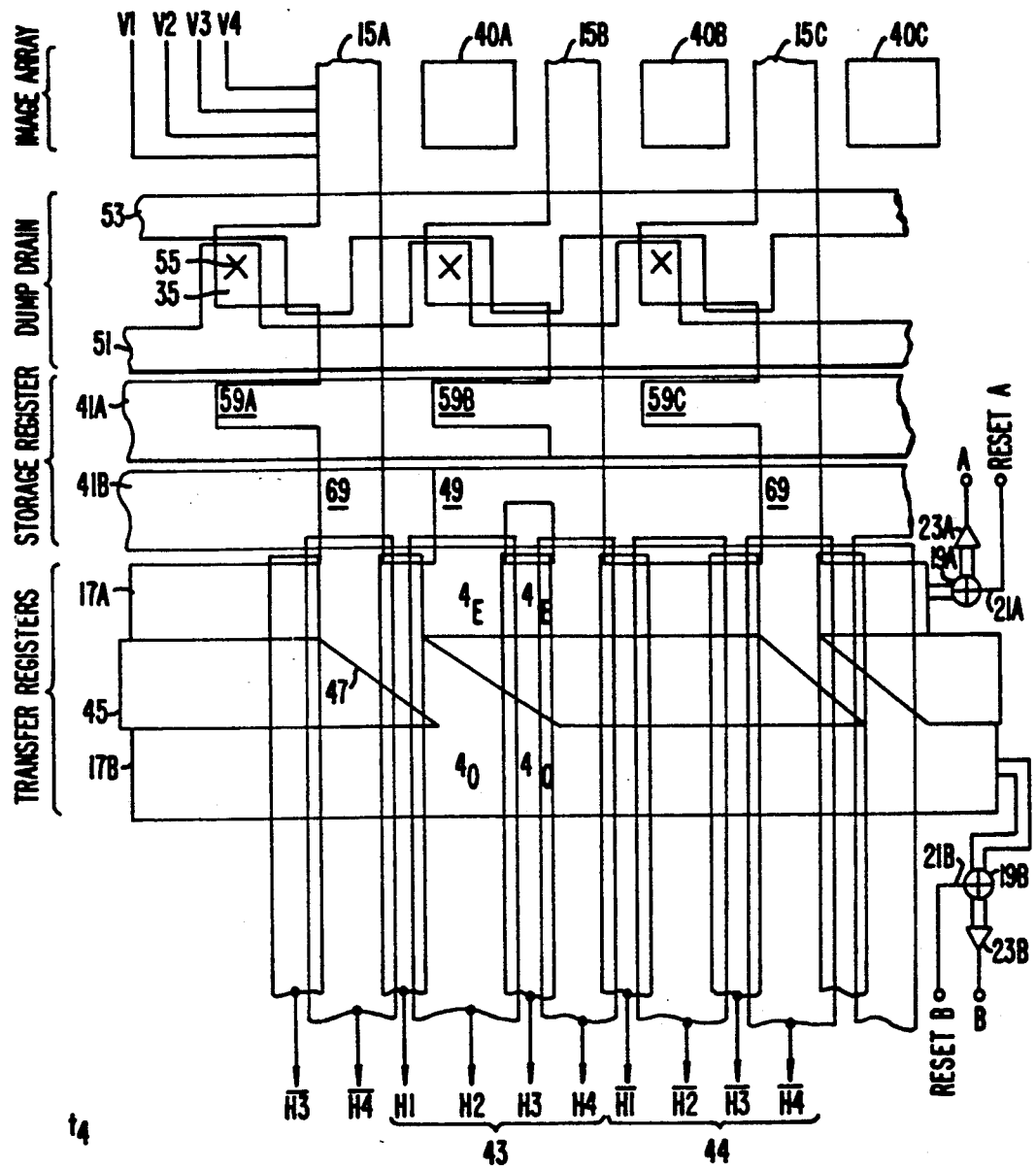

At time $t_4$, FIG. 6E shows even charges transferred from storage site 49 to gates H2 and H3 overlaying transfer register 17A. Odd charges move from storage site 49 to gates H2, and H3 overlaying transfer register 17B. This is accomplished by setting $V_t$ and $V_{str1}$ low and H2 and H3 high.

Figure 6F:
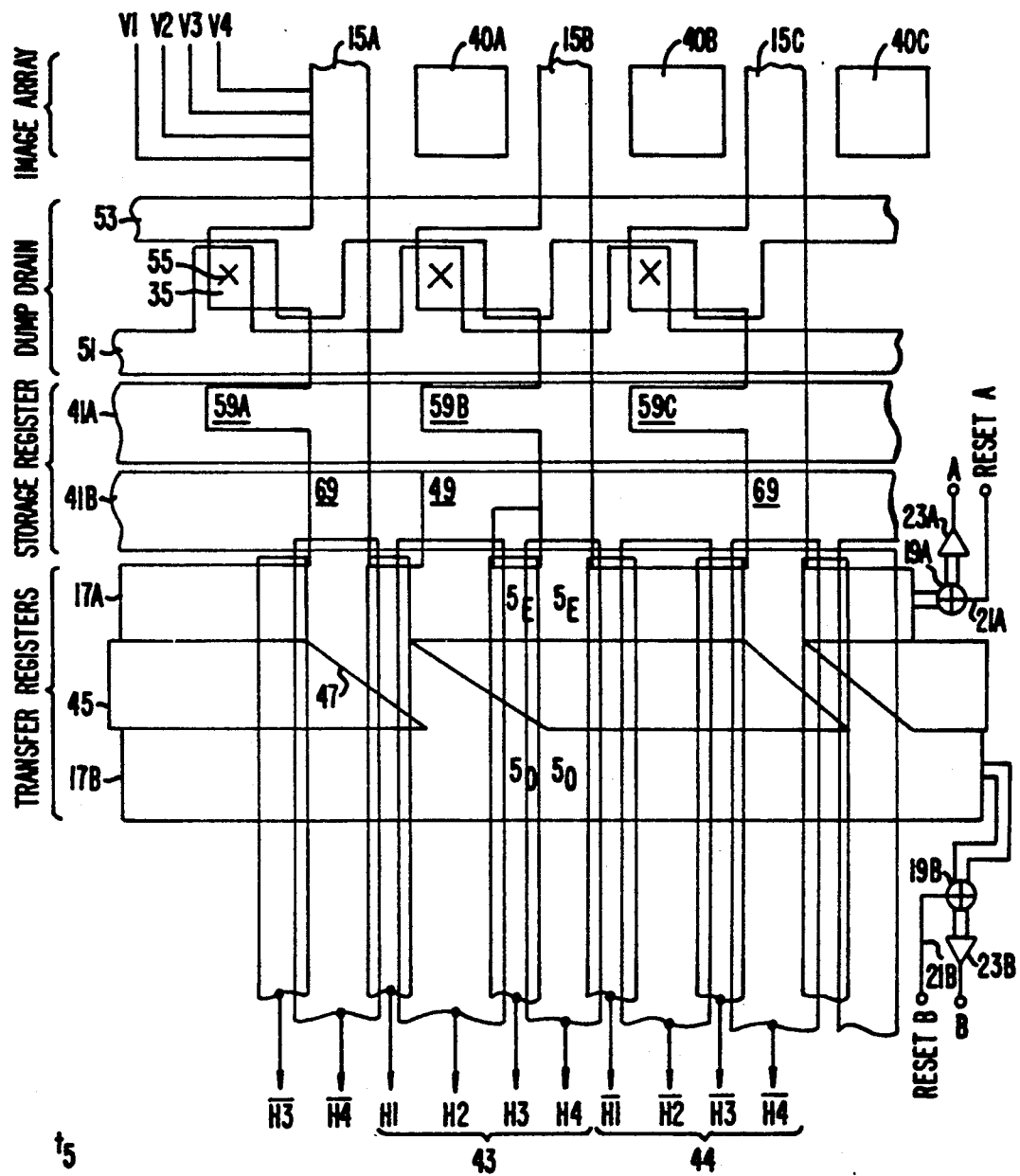

At time $t_5$, FIG. 6F shows even charges are transferred from gates H2 and H3 in transfer register 17A to gates H3 and H4 in transfer register 17A. Odd charges are transferred from gates H2 and H3 in transfer register 17B to gates H3 and H4 in transfer register 17B. This is accomplished by setting H2 low and H3 and H4 high. At time intervals after $t_5$, transfer registers 17 are clocked so that the charges move across transfer registers 17 until they are clocked out through output ports 19.

Various methods of clocking can be implemented to move the charges through both vertical registers 15 and transfer registers 17. Clocking schemes can be two-phase, four-phase (as shown in FIGS. 5), eight-phase, etc.

Figure 7:
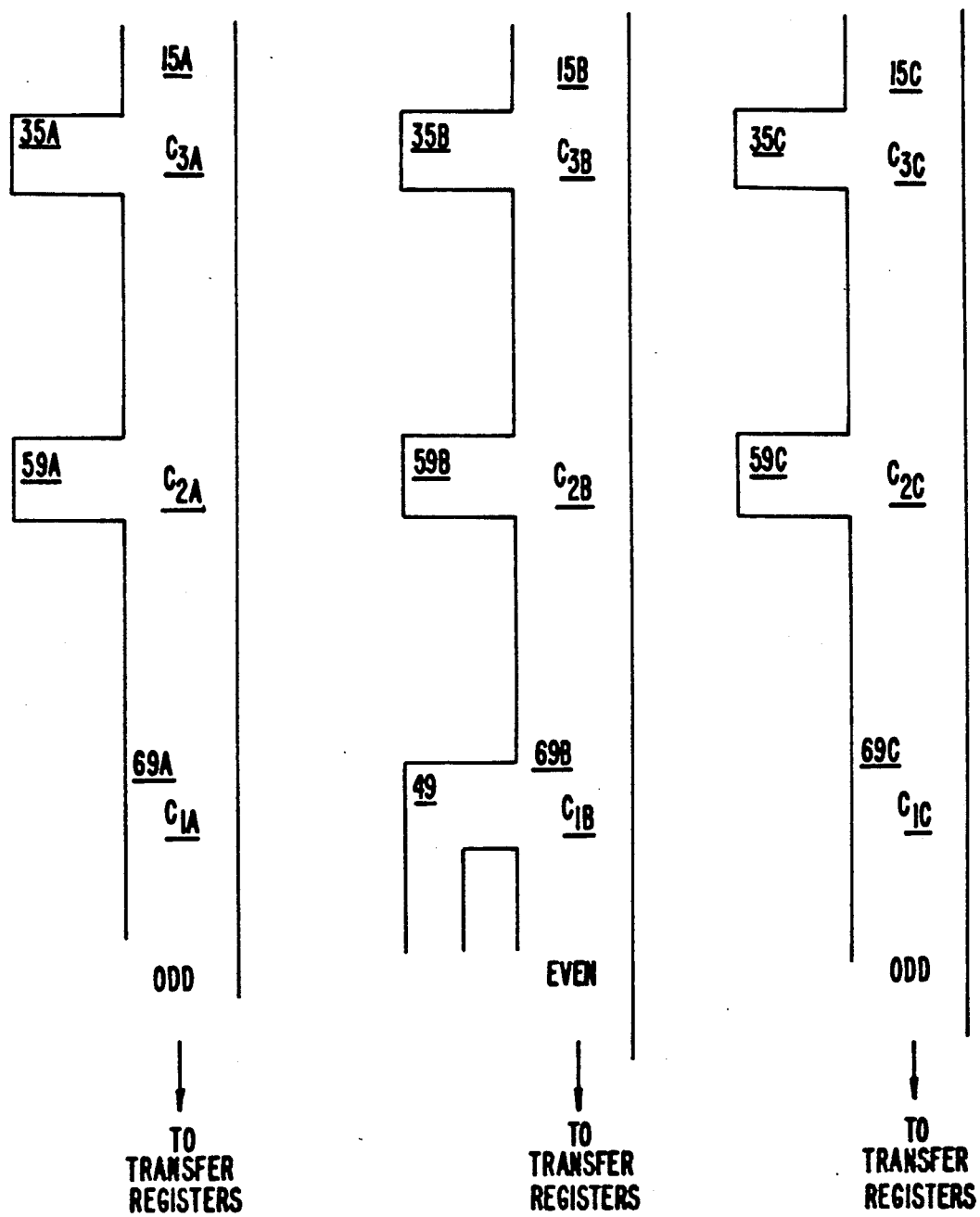
FIG. 7 is a diagram of the vertical registers showing dump drains and storage sites.

FIG. 7 is a diagram showing vertical registers 15 with rows of charges moving through them. A first row of charges $A_{1A-1C}$ is shown at site 69 in vertical registers 15 just before transfer into transfer registers 17 (not shown). Odd charges $C_{1A}$ and $C_{1C}$ will move through transfer register 17A and into transfer register 17B. Even charge $C_{1B}$ will move into storage site 49 and then down into transfer register 17B as described in FIGS. 6B–F.

A second row of charges $C_{2A-2C}$ is shown at the point in vertical registers 15 next to storage sites 59A–C. This row can either be moved into storage sites 59A–C for charge manipulation or accumulation or continue through vertical registers 15 to transfer registers 17.

A third row of charges $C_{2A-2C}$ is shown at the point next to dump drains 35A–C. This row can either be dumped or it can continue through vertical registers 15 to be manipulated or accumulated in storage sites 59 or moved directly to transfer registers 17.

Figure 8:
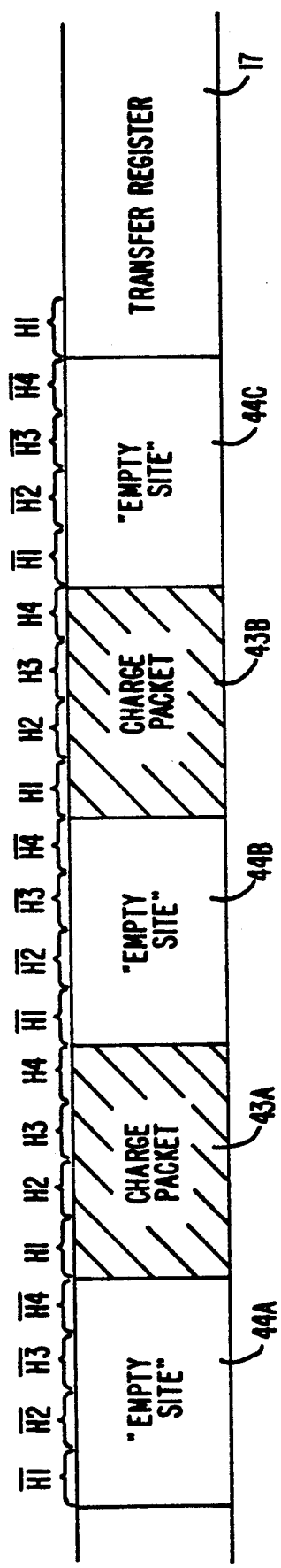
FIG. 8 is a diagram of a transfer register with empty sites and charge packets in every other location.

FIG. 8 is a diagram of a transfer register 17. Empty sites and charge packets are shown in every other location. The charge values stored in each location is shifted over by clocking gates H1–H4 and H1–H4 indicated above transfer register 17. Manipulation of charge values can be achieved by holding a first charge packet in its present location and shifting a second charge packet into that same location. In this way the two charges are added together achieving increased charge transfer efficiency or accumulation of rows.

For example, if the first row of charges from FIG. 7 was moved into the transfer register of FIG. 8, it would contain either the odd or even charges in every other location. Assuming the odd charges were transferred into this transfer register, $C_{1A}$ would occupy location 43A while $C_{1C}$ would occupy location 43B. To add the charges together, $C_{1C}$ would be held in its location while $C_{1A}$ would be shifted into that same location. The result is an accumulation of charge equal to $C_{1A}+C_{1C}$. Recapture of lost charge from empty site locations 44 is accomplished in the same manner.

Figure 9:
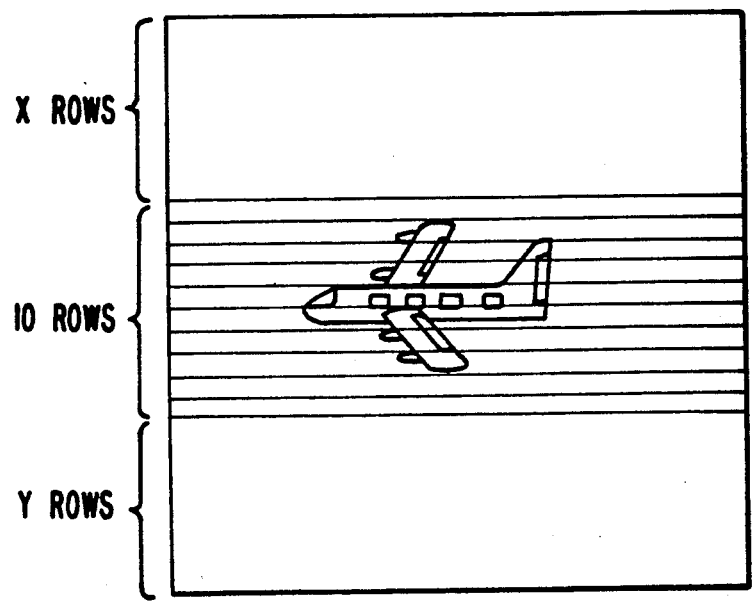
FIGS. 9 is a diagram showing an image as it is initially obtained.
Figure 10:
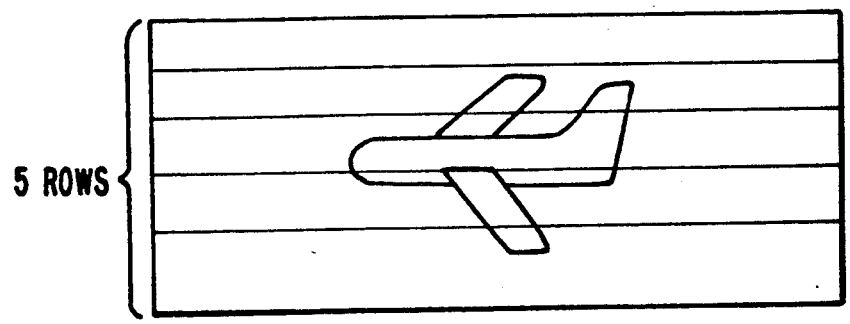
FIG. 10 is a diagram showing the image of FIG. 9 after spatial filtering has been performed upon it; and Table 1 is a list of the steps used in wafer fabrication for achieving a chip layout which functions in accordance with the invention.

Vertical spatial filtering is achieved by manipulating the charge values while they are stored in storage sites 59 of vertical registers 15. An example of vertical spatial filtering is shown in FIG. 10 wherein the ten rows of FIG. 9 containing the airplane image are combined to form five rows. Although some details of the airplane are lost in this operation, the number of charge values which result is cut in half. The transfer of these charge values can then be performed in half the time as the original ten rows.

Similarly, horizontal spatial filtering can be performed on the columns of the image in transfer registers 17 to further reduce the number of charge values to be transferred per row. This is accomplished by adding the charge values from one location to the charge values of a second location as described with reference to FIG. 8. For other charge value manipulations, transfer registers 17 can be fabricated with storage sites similar to those shown formed in vertical registers 15 in FIGS. 6A–F.

Another charge manipulation which can be performed on the image is to change each of the values by a constant value. This results in a change in the thermal background of the image to enhance the dynamic range of the image by only storing thermal signature rather than thermal background information. Adding constant amount of charge to the rows will enhance charge transfer efficiency in the transfer registers 17 in the case of very low thermal background (e.g. cold sky imaging. Charge manipulation also permits the sequence of the rows to be altered a they are output from the imaging device.

Table 1 provides an illustrative process sequence which may be used in fabrication of a device in accordance with the invention. It will be recognized by those of ordinary skill in the art that this fabrication sequence is merely illustrative of one method of fabricating a device in accordance with the invention.

TABLE 1

| Layer | Comments |
| --- | --- |
| 1) field oxide | define CCD channel |
| 2) channel stop | define borders of transfer region 47 |
| 3) buried channel CCD implant | define vertical and transfer register transfer regions 47 |
| 4) Polysilicon gate level (1) | define transfer gate $V_T$ in the interconnecting register area and to define phase $V_1$ and $V_3$ of vertical registers 15 |
| 5) Polysilicon gate level (2) | defines $V_2-V_4$ in 15 vertical registers and H1 and H3 of transfer registers 17 |
| 6) Polysilicon gate level (3) | to define H2 and H4 in transfer registers 17, control gates $V_{STR1}$, $V_{STR2}$, 41A, 41B, and dump drain control gate 50 |
| 7) several N+ implant layers | define guard ring for photo site, sources and drains of transistors and dump drains 35 |
| 8) contact mask | connect dump drains 35 and transistors of the output amplifier and clock gates to external bonding pads |
| 9) Schottky detector layer | define the region where the PtSi detector (photo site) is formed |
| 10) dielectric mask layer | cover the thin PtSi layer and act as an optical cavity |
| 11) Aluminum metal layer | connect different components of the circuit the contacts to output signal pads |
| 12) pad mask | open passivation layer on the circuit and pad in bonding operating with external wires |

In general, to those skilled in the art to which this invention relates, many changes in fabrication and widely differing embodiments and applications of the present invention will suggest themselves without departing from the spirit and scope of the invention. For instance, the transfer registers 17A and 17B could be changed so that transfer register 17B is used to transfer even charges and transfer register 17A is used to transfer odd charges. Another possibility is to use more than two transfer registers to increase transfer rate even more.

Further, while the invention has been illustrated primarily with regard to IR imaging systems it will be apparent that the invention could be used in association with visual, or other imaging devices. Additionally, storage sites and dump drains can be interleaved in the image array itself. Thus, the disclosures and description herein are purely illustrative and are not intended to be in any sense limiting. The scope of the invention is set forth in the appended claims.

What is claimed is:

1. A system for achieving high frame rate transfer of an image from an image array including a plurality of pixels arranged in columns and rows for storing an image, comprising:
   at least one dump drain connected to a storage register for dumping rows of the image not selected for transfer;
   at least two vertical registers connected between the image array and said storage register, each vertical register for transferring a column of pixel data, said at least two vertical registers transferring pixel data to said storage register a row at a time; and
   a first output register for receiving first output data from said storage register via said at least two vertical registers which have not been dumped in said at least one dump drain.

2. The system of claim 1 further comprising a second output register for receiving second data from said storage register via said at least two vertical registers which have not been dumped in said at least one dump drain.

3. The system of claim 1 wherein said first output data comprises data stored in odd-numbered columns of a first given row of data previously stored in said storage register.

4. The system of claim 2 wherein said second data comprises data stored in even-numbered columns of a first given row of data previously stored in said storage register.

5. The apparatus of claim 1 further wherein said at least two vertical registers include at least one location for pixel charge storage in which data is stored.

6. A method for transferring an image rom an image array, comprising the steps of:
   recording the image in an imaging array arranged in rows and columns of individual pixels;
   transferring at least one selected row through at least two vertical registers to a storage register, said storage register for storing at least two rows of data transferred from said image array;
   transferring unselected rows of data to a dump drain; and
   transferring said at least one selected row to an output means.

7. The method of claim 6 wherein the step of transferring said at least one selected row to an output means further comprises the steps of:
   transferring values held in odd-numbered columns in said at least one selected row to a first transfer register in said output means such that each odd storage position of said first transfer register contains odd storage data from said storage register and each even storage position of said first transfer register is an empty site; and
   transferring values held in even-numbered columns in said at least one selected row to a second transfer register in said output means such that each even storage position of said second transfer register contains even storage data from said storage register and each odd storage position of said second transfer register is an empty site.

8. The method of claim 7 further comprising the steps of:
   adding a first data value in a last storage location of said first transfer register to a second data value in a next to last storage location of said first transfer register to yield a first output data value;
   outputting said first output data value; and
   clocking said first transfer register such that data in each storage location is shifted two positions in a first direction;
   adding a third data value in a last storage location of said second transfer register to a fourth data value in a next to last storage location of said second transfer register to yield a second output data value;
   outputting said second output data value; and
   clocking said second output register such that data in each storage location is shifted two positions in said first direction.

9. The method of claim 8 further comprising the step of:
   repeating the steps of claim 8 until data originally held in each of the locations of said first and second transfer registers has been output.

10. The method of claim 9 further comprising the steps of:
    receiving said first output data value;
    receiving said second output data value; and
    interleaving said first output data value and said second output data value to reform a sequence of data in a row as originally recorded in the imaging array.

11. The method of claim 6 further comprising the step of changing the value of each of said individual pixels by a constant value while said individual pixel values are stored in said storage register.

12. The method of claim 6 further comprising the step of combining at least two of said rows of pixels to reduce the number of pixel values.

13. The method of claim 6 further comprising the step of combining at least two of said columns of pixels to reduce the number of pixel values.

14. A system for achieving high frame rate transfer of an image from an image array including a plurality of pixels arranged in columns and rows for storing an image, comprising:
    at least two vertical registers connected to the image array, each vertical register for transferring data stored in columns of pixels in the image array;
    a first output register connected to said at least two vertical registers for receiving first data from said vertical registers such that said first data is stored in every other position of said first output register; and
    wherein said at least two vertical registers include at least one location for pixel charge storage in which data is stored.

15. A method for transferring an image from an image array, comprising the steps of:
    recording the image in an imaging array arranged in rows and columns of individual pixels containing charges representing the image;
    transferring a first row of charges from said imaging array to at least two vertical registers;
    transferring values held in odd-numbered columns in said at least one selected row to a first transfer register in said output means such that each odd storage position of said first transfer register contains odd storage data from said storage register and each even storage position of said first transfer register is an empty site;
    transferring values held in even-numbered columns in said at least one selected row to a second transfer register in said output means such that each even storage position of said second transfer register contains even storage data from said storage register and each odd storage position of said second transfer register is an empty site;

adding a first data value in a last storage location of said first transfer register to a second data value in a next to last storage location of said first transfer register to yield a first output data value;

outputting said first output data value;

clocking said first transfer register such that data in each storage location is shifted two positions in a first direction;

adding a third data value in a last storage location of said second transfer register to a fourth data value in a next to last storage location of said second transfer register to yield a second output data value;

outputting said second output data value; and clocking said second output register such that data in each storage location is shifted two positions in said first direction.

16. The method of claim 15 further comprising the step of:
repeating the steps of claim 15 until data originally held in each of the locations of said first and second transfer registers has been output.

17. The method of claim 16 further comprising the steps of:
receiving said first output data value;
receiving said second output data value; and
interleaving said first output data value and said second output data value to reform a sequence of data in a row as originally recorded in the imaging array.

18. A method for transferring an image from an image array, comprising the steps of:
recording the image in an imaging array arranged in rows and columns of individual pixels containing charges representing the image;
transferring a first row of charges from said imaging array to at least two vertical registers;
shifting said first row of charges through said vertical registers to an output means such that said charges are positioned in every other storage location of said output means; and
changing the value of each of said individual pixels by a constant value while said individual pixel values are stored in said storage register.

19. The method of claim 18 wherein the step of changing the value further comprises subtracting a constant.

20. The method of claim 18 wherein the step of changing the value further comprises adding a constant.

21. A method for transferring an image from an image array, comprising the steps of:
recording the image in an imaging array arranged in rows and columns of individual pixels containing charges representing the image;
transferring a first row of charges from said imaging array to at least two vertical registers;
shifting said first row of charges through said vertical registers to an output means such that said charges are positioned in every other storage location of said output means; and
combining at least two of said rows of pixels to reduce the number of pixel values.

22. A method for transferring an image from an image array, comprising the steps of:
recording the image in an imaging array arranged in rows and columns of individual pixels containing charges representing the image;
transferring a first row of charges from said imaging array to at least two vertical registers;
shifting said first row of charges through said vertical registers to an output means such that said charges are positioned in every other storage location of said output means; and
combining at least two of said columns of pixels to reduce the number of pixel values.

23. A system for achieving high frame rate transfer of an image from an image array comprising:
a plurality of pixels arranged columns and rows for storing said image, said columns of pixels including a plurality of alternating first and second columns, said first columns being adjacent to said second columns, said image occurring in the infrared radiation range at a cryogenic temperature;
at least two vertical registers connected to the image array, each vertical register for transferring data stored in said columns of pixels in the image array; and
a first output register having even and odd data storage positions, said first output registers connected to said at least two vertical registers for receiving a row of pixel charge from said image array, said first output register for storing pixel charge from said first columns of said imaging array in each odd data storage position of said first output register, each odd data storage position of said first output register being an empty site.

24. A method for transferring an image rom an image array, comprising:
cooling said array to a cryogenic temperature;
recording the image in an imaging array in the infrared radiation range, said imaging array arranged in rows and columns of individual pixels containing charges representing the image, said columns of pixels including a plurality of alternation first and second columns, said first columns being adjacent to said second columns;
transferring a first row of charges from said imaging array to vertical registers;
transferring said first row of charges through said vertical registers to a first output register such that pixel charge from the first columns of said imaging array is stored in first data storage positions of said first output register and alternate data storage positions of said first output register are empty sites; and
transferring said charge from said odd columns into a second output register such that said pixel charge from the second columns of said imaging array is stored in first data storage positions of said second output register and alternate data storage position of said second output register are empty sites.

* * * * *